US011902640B2

United States Patent
Caturla et al.

(10) Patent No.: US 11,902,640 B2
(45) Date of Patent: Feb. 13, 2024

(54) SYSTEM FOR DISPLAYING BUBBLES UNDER AN ADHESIVE SHEET

(71) Applicant: Airbus SAS, Blagnac (FR)

(72) Inventors: Jean-Pascal Caturla, Toulouse (FR); Jean-Luc Vialatte, Toulouse (FR); Michel Dos Reis, Toulouse (FR); François Lefebvre Albaret, Toulouse (FR); Julien Nouvet, Blagnac (FR); Ivan Garcia Hallo, Toulouse (FR); Robert Ray Thompson, Wichita, KS (US)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 233 days.

(21) Appl. No.: 17/321,932

(22) Filed: May 17, 2021

(65) Prior Publication Data

US 2021/0368083 A1 Nov. 25, 2021

(30) Foreign Application Priority Data

May 19, 2020 (FR) ...................................... 2004983

(51) Int. Cl.
*H04N 23/51* (2023.01)
*B64D 43/00* (2006.01)
*H04N 23/53* (2023.01)
*G02F 1/137* (2006.01)
*H04N 23/56* (2023.01)

(52) U.S. Cl.
CPC ............. *H04N 23/53* (2023.01); *G02F 1/137* (2013.01); *H04N 23/56* (2023.01); *B64D 43/00* (2013.01)

(58) Field of Classification Search
CPC ........ H04N 23/53; H04N 23/56; G02F 1/137; B64D 43/00
See application file for complete search history.

(56) References Cited

U.S. PATENT DOCUMENTS

| 5,257,088 A * | 10/1993 | Tyson, II | G01B 11/161 244/125 |
| 6,088,116 A | 7/2000 | Pfanstiehl | |
| 7,765,853 B2 * | 8/2010 | Safai | G01M 3/363 73/40 |
| 10,748,798 B1 * | 8/2020 | Tsai | C23C 16/52 |
| 11,479,849 B2 * | 10/2022 | Trinh | C23C 14/543 |

(Continued)

FOREIGN PATENT DOCUMENTS

JP 2000321210 A 11/2000
WO 2014184337 A1 11/2014

OTHER PUBLICATIONS

French Search Report; priority document.
(Continued)

*Primary Examiner* — James T Boylan
(74) *Attorney, Agent, or Firm* — Greer, Burns & Crain, Ltd.

(57) ABSTRACT

A display system comprising a bell with a lateral wall and a ceiling, delimiting between them an internal volume with an opening opposite the ceiling, a depressurizing arrangement configured to produce a depressurization in the internal volume, an image capturing device at the ceiling, a display screen, and a processing unit receiving an image from the image capturing device and sending the image to the display screen.

14 Claims, 1 Drawing Sheet

(56) References Cited

U.S. PATENT DOCUMENTS

| | | | | |
|---|---|---|---|---|
| 2005/0134853 A1* | 6/2005 | Ingleson | ............... | G01N 21/255 |
| | | | | 356/402 |
| 2011/0044697 A1* | 2/2011 | Peter | ................... | H04B 10/801 |
| | | | | 359/341.1 |
| 2014/0333759 A1* | 11/2014 | White | ................... | H04N 23/00 |
| | | | | 348/125 |
| 2015/0215584 A1 | 7/2015 | Tapia et al. | | |
| 2018/0259461 A1* | 9/2018 | Haynes | ..................... | G06F 3/14 |
| 2018/0275493 A1* | 9/2018 | Hirota | .................... | H04N 23/51 |
| 2018/0352163 A1* | 12/2018 | Ando | ..................... | H04N 23/63 |
| 2018/0372603 A1* | 12/2018 | Safai | ...................... | G01B 11/162 |
| 2019/0253695 A1* | 8/2019 | Festa | ................... | H04N 13/246 |
| 2019/0310204 A1* | 10/2019 | Rueb | ................. | G01N 21/8422 |
| 2019/0360941 A1* | 11/2019 | Ziltz | .................. | G01N 21/8806 |
| 2020/0198462 A1* | 6/2020 | Koukan | ........... | B60K 15/03519 |
| 2021/0026134 A1* | 1/2021 | Harkins | ................ | G02F 1/1334 |
| 2021/0056658 A1* | 2/2021 | Safai | ..................... | G06T 1/0014 |
| 2023/0038606 A1* | 2/2023 | Johnsen | ............... | A61B 1/0008 |

OTHER PUBLICATIONS

Emmanuel Prados and Olivier Faugeras, "Shape from Shading" dated Apr. 21, 2009; https://hal.inria.fr/inria-00377417.

Manh The Nguyen, Young-Sik Ghim and Hyug-Gyo Rhee, "Single-Shot Deflectometry for Dynamic 3D Surface Profile Measurement by Modified Spatial-Carrier Frequency Phase-Shifting Method" published on Feb. 28, 2019; https://www.nature.com/articles/s41598-019-39514-6.

* cited by examiner

SYSTEM FOR DISPLAYING BUBBLES UNDER AN ADHESIVE SHEET

CROSS-REFERENCES TO RELATED APPLICATIONS

This application claims the benefit of the French patent application No. 2004983 filed on May 19, 2020, the entire disclosures of which are incorporated herein by way of reference.

FIELD OF THE INVENTION

The present invention relates to a display system which makes it possible to display a bubble present under an adhesive sheet, and a display method implementing such a display system.

BACKGROUND OF THE INVENTION

In many installations, such as, for example, in an aircraft, there are panels which are covered with an adhesive sheet. The function of such an adhesive sheet is primarily aesthetic to cover the underlying panel.

Despite the care taken in gluing such an adhesive sheet, it may be that an air bubble is captured between the panel and the adhesive sheet, which results in an aesthetic defect that has to be corrected.

In the context of an aircraft, such a bubble can appear after the first flight when the pressure falls below the pressure on the ground. It is then necessary to perform a repair on the ground and carry out a new flight to check that all the bubbles detected have indeed disappeared.

This approach is then relatively costly and it is desirable to find means for detecting the presence of the bubbles before the first flight, or for checking that the aesthetic defects possibly present (presence of air bubbles which appear during the first flight of the aircraft) have indeed been corrected (during a repair on the ground, after the first flight) without necessitating a new flight.

SUMMARY OF THE INVENTION

One object of the present invention is to propose a display system which makes it possible to display the possible presence of a bubble present under an adhesive sheet.

To this end, a display system is proposed comprising:
a bell comprising at least one lateral wall and a ceiling fixed at the top part of the lateral wall to delimit between them an internal volume in which the bell has an opening opposite the ceiling,
depressurizing means configured to produce a depressurization in the internal volume,
capture means arranged at the ceiling and whose visual axis is oriented towards the opening,
a display screen, and
a processing unit arranged to receive an image captured by the capture means and send it to the display screen which displays it.

Thus, by passing the apparatus over the adhesive sheet, any bubbles appear on the screen and the technician can then detect the points where the gluing has to be corrected.

In the case where the display system is used on an adhesive sheet in which bubbles have been removed (following a repair on the ground, after a first flight of the aircraft), and in which no bubble appears on the screen, the technician can conclude therefrom that the repair of the adhesive sheet has been correctly carried out, and that an additional flight of the aircraft is not necessary. If bubbles appear on the screen, the technician can then detect the points where the gluing has to be corrected once again.

Advantageously, the depressurizing means comprises a vacuum tank, a suction pipeline fluidically linking the vacuum tank to the internal volume, a vacuum pump fluidically linked to the vacuum tank, and a valve installed on the suction pipeline and movable between an open position in which the vacuum tank and the internal volume are fluidically connected, and a closed position in which the vacuum tank and the internal volume are fluidically isolated from one another, and in which the valve is electrically controlled in terms of position by the processing unit.

Advantageously, the display system comprises a plurality of light sources distributed inside the lateral wall around the opening at the foot of the lateral wall and in which each light source is controlled in terms of switching on and switching off by the processing unit.

Advantageously, the light sources are light-emitting diodes.

Advantageously, for each light source, the display system comprises a first opaque cover arranged between the light source and the capture means.

Advantageously, the ceiling is transparent and bears, on its face oriented towards the internal volume, geometrical patterns, and the display system comprises at least one light source arranged at the ceiling and above the geometrical patterns so as to diffuse the light towards the internal volume through the geometrical patterns and the or each light source is controlled in terms of switching on and switching off by the processing unit.

Advantageously, the display system comprises a second opaque cover arranged around the capture means between the light source and the capture means.

Advantageously, the internal surface of the lateral wall is covered with a mirror surface.

Advantageously, the mirror surface is covered with a liquid crystal screen whose opacity is controlled electronically by the processing unit.

Advantageously, the display system comprises an electronic circuit board disposed on the lateral wall and connected to the processing unit, to the capture means and to the light sources. The electronic circuit board is configured to receive an image captured by the capture means and send it to the processing unit, and to control the switching on and the switching off of the light sources, on command from the processing unit.

Advantageously, the internal surface of the lateral wall is covered with a lining produced in an anti-reflection material.

Advantageously, the display system comprises a first seal which extends around the opening at the foot of the lateral wall and a second seal arranged at the foot of the lateral wall and outside the bell.

Advantageously, the display system comprises a handle fixed on top of the ceiling and metal reinforcements arranged between the handle and the bell.

Advantageously, the display system comprises a protection valve arranged on the bell and configured to be in a closed position when the pressure in the internal volume is greater than a predetermined pressure threshold, and to be in an open position when the pressure in the internal volume is less than or equal to the predetermined pressure threshold.

The invention relates also to a method for displaying, by means of a display system according to the invention, comprising the steps:

placing the opening of the bell over an adhesive sheet which is glued onto a panel;

producing a depressurization in the internal volume, by means of the depressurizing means;

capturing at least one image of the sheet, by means of the capture means;

transmitting the at least one captured image to the processing unit;

sending the at least one transmitted image to the display screen; and displaying the at least one sent image on the display screen.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
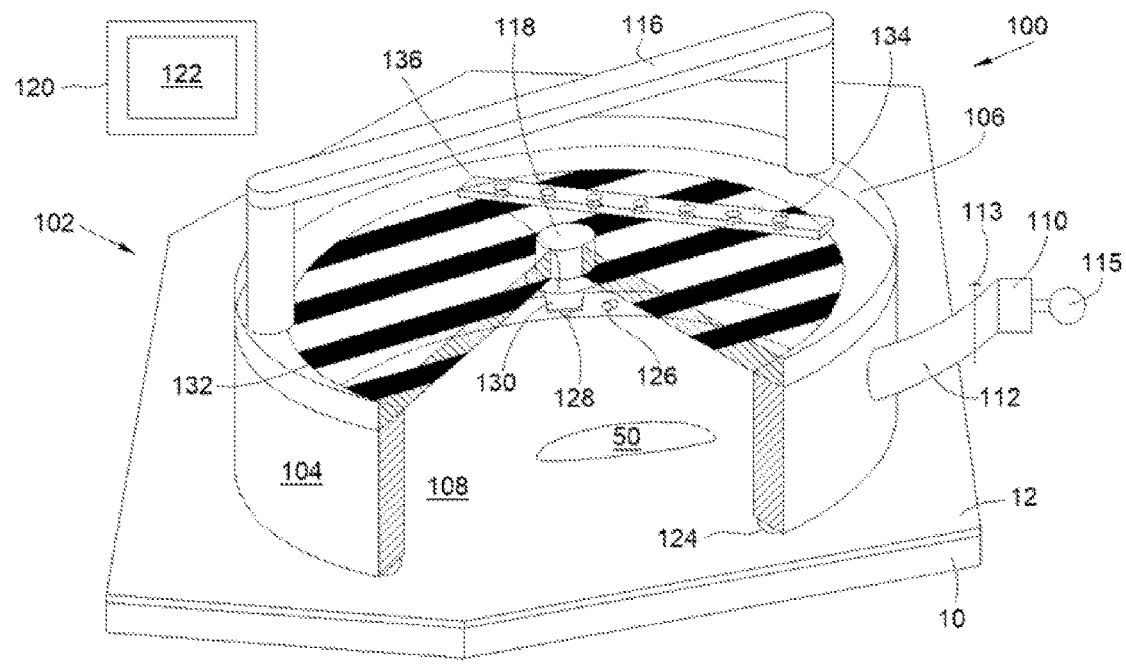
FIG. 1 is a perspective view of a display system according to an embodiment of the invention.

FIG. 1 shows a display system 100 which makes it possible to display a bubble 50 present between a panel 10 and an adhesive sheet 12 glued onto the panel 10. In FIG. 1, the display system 100 has been cut out to show the interior.

Hereinafter in the description, the display system 100 is implemented in the context of an aircraft, but it can be implemented in other types of installations, in particular in installations which operate at pressures lower than ground pressure.

The display system 100 comprises a bell 102 which, here, is cylindrical, but could take another form such as, for example, parallelepipedal or pyramidal.

The bell 102 comprises a lateral wall 104 and a ceiling 106 fixed at the top part of the lateral wall 104 to delimit between them an internal volume 108 that is open opposite the ceiling 106, here towards the bottom. The bell 102 thus has an opening opposite the ceiling 106.

The bell 102 is manufactured by three-dimensional (3D) printing of a glass bead-filled material. The bell 102 is thus strong.

The display system 100 also comprises depressurizing means which makes it possible to produce a depressurization in the internal volume 108. The depressurization must be sufficient to reproduce the pressure of an aircraft in flight. The display system 100 comprises a handle 116 fixed on top of the ceiling 106 to allow it to be grasped by a technician.

When it is being used, the opening of the bell 102, that is to say, the bottom part of the lateral wall 104, is applied against the sheet 12 and held by the technician.

The depressurizing means is then activated to reduce the pressure in the internal volume 108 and, if the gluing of the sheet 12 is defective, a bubble 50 will form in the internal volume 108.

The display system 100 also comprises capture means 118, typically a camera, arranged at the ceiling 106 and whose visual axis is oriented towards the opening. The capture means 118 is disposed here at the center of the ceiling 106.

The capture means 118 is provided to take at least one image of the sheet 12 seen inside the bell 102.

The display system 100 also comprises a processing unit 120, of the type comprising the following elements, linked by a communication bus: a processor or CPU (central processing unit); a random access memory (RAM); a read only memory (ROM); a storage unit such as a hard disc or a storage medium reader, such as an SD (secure digital) card reader; at least one communication interface, allowing, for example, the processing unit to communicate with the capture means 118 by wired or wireless links.

The processor is capable of executing instructions loaded into the RAM from the ROM, from an external memory (not represented), from a storage medium (such as an SD card), or from a communication network. When the equipment is powered up, the processor is capable of reading instructions from the RAM and of executing them. These instructions form a computer program causing the implementation, by the processor, of all or part of the algorithms and steps described hereinbelow.

All or part of the algorithms and steps described hereinbelow can be implemented in software form by execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

The display system 100 also comprises a display screen 122 which, here, is incorporated in the processing unit 120 and in communication therewith.

The processing unit 120 can be incorporated in a portable computer, in a tablet, or in a smartphone.

The processing unit 120 can thus receive the image captured by the capture means 118 and send it to the display screen 122 for it to be displayed. The technician can then check whether a bubble appears on the display screen 122 and the appropriate repair can then be made. If no bubble appears, the technician can conclude from that that there is no need to make or repeat a flight of the aircraft, the gluing of the adhesive sheet 12 on the panel 10 being correct.

To ensure a good seal of the sheet 12 around the opening, the lateral wall 104 is equipped with a seal 124, for example made of neoprene, which extends around the opening at the foot of the lateral wall 104.

According to a particular embodiment, the depressurizing means comprises a pump which sucks the air present in the internal volume 108 through a suction pipeline fluidically connected to the internal volume 108 through an orifice passing through the lateral wall 104. The pump can be a manual pump installed on the handle 116 and actuated by the technician or an electric pump controlled by the technician from the processing unit 120. The depressurizing means can comprise both a manual pump installed on the handle 116 and that can be manually actuated by the technician, and an electric pump that can be controlled by the technician from the processing unit 120. The technician can then choose which pump he or she wants to use.

In the embodiment presented in FIG. 1, the depressurizing means comprises a vacuum tank 110 fluidically connected to the internal volume 108 by a suction pipeline 112 through an orifice passing through the lateral wall 104. The depressurizing means also comprises a vacuum pump 115 fluidically linked to the vacuum tank 110 to suck the air from the vacuum tank 110 and keep it depressurized. The depressurizing means also comprises a valve 113 installed on the suction pipeline 112, and which is movable between an open position and a closed position. In the open position, the vacuum tank 110 and the internal volume 108 are fluidically connected and, in the closed position, the vacuum tank 110 and the internal volume 108 are fluidically isolated from one another. The valve 113 is electrically controlled in terms of position by the processing unit 120 which can thus switch it from the closed position to the open position and vice versa.

Thus, from the closed position, the vacuum tank 110 is depressurized, and when the processing unit 120 commands the opening of the valve 113, at least a portion of the air from the internal volume 108 is abruptly sucked into the vacuum tank 110, thus rapidly creating a depressurization in the internal volume 108.

The depressurizing means can comprise a protection valve (not represented in FIG. 1) protecting against an underpressure in the internal volume 108. The protection valve is arranged on the bell 102 and makes it possible to limit the depressurization in the internal volume 108. More specifically, the valve is configured to be closed as long as the pressure in the internal volume 108 is greater than a predetermined pressure threshold, and to open when the pressure in the internal volume 108 becomes less than or equal to the predetermined pressure threshold.

In the embodiment of the invention presented in FIG. 1, the vacuum tank 110 and the pump 115 are outside, but they can be installed in the handle 116 for example. According to another embodiment, the vacuum tank 110 is installed in the handle 116 and the pump 115 is installed on the processing unit 120, and a pneumatic link then extends between the processing unit 120 and the handle 116. According to another embodiment, the vacuum tank 110 and the pump 115 are installed on the processing unit 120 and the suction pipeline 112 then extends between the processing unit 120 and the internal volume 108.

The display system 100 comprises a pressure sensor 126 which is arranged on the bell 102 so as to measure the pressure in the internal volume 108. The pressure information collected by the pressure sensor 126 is transmitted to the processing unit 120 which can display it on the display screen 122 and, if necessary, can use it to control the depressurizing means in order for the pressure in the internal volume 108 to reach a setpoint value stored in a memory of the processing unit 120.

The display system 100 can comprise a second display screen (not represented in FIG. 1), arranged on the bell 102. The pressure information collected by the pressure sensor 126 can then be directly displayed on the second display screen.

To refine the results of detection of a bubble 50, the processing unit 120 comprises means, in particular software means, for processing each image captured by the capture means 118.

Generally, the sheets 12 can be classified in two categories, namely those with light colors and those with dark colors.

In the case of a light sheet, it is preferable to use the shadowgraphy technique and, in the case of a dark sheet, it is preferable to use the deflectometry technique. Depending on the type of sheet 12 to be analyzed, the display system 100 can be equipped to use one or other of the techniques and, preferentially, it is equipped to use both techniques as chosen by the technician.

To use the shadowgraphy technique, the display system 100 comprises a plurality of light sources 128, for example light-emitting diodes (LED), distributed inside the lateral wall 104 around the opening at the foot of the lateral wall 104. Preferentially, there are four light sources 128 distributed in each quadrant of the internal volume 108. The light sources 128 illuminate the sheet 12 with oblique incidence to reveal the shadows of the bubbles.

Each light source 128 is controlled in terms of switching on and switching off by the processing unit 120 and the light sources 128 are arranged to obliquely illuminate the sheet 12 to generate a shadow of the bubble 50. The light sources 128 are controlled in terms of switching on and switching off in such a way that when one light source 128 is on, the other light sources 128 are off.

To avoid a direct illumination of the capture means 118 by the light sources 128, the display system 100 comprises, for each light source 128, a first opaque cover 130 which comes between the light source 128 and the capture means 118. The first cover 130 is, here, secured to the lateral wall 104.

Once the display system 100 is disposed on the sheet 12 and once the pressure inside the bell 102 reaches the desired pressure, the capturing of images by the capture means 118 comprises successively switching on each light source 128 and in capturing an image of the sheet 12 each time a light source is switched on. The processing unit 120 then comprises means for processing the images thus captured according to the shadowgraphy technique. One shadowgraphy technique is notably described in the document "Shape from Shading" by Emmanuel Prados and Olivier Faugeras, dated 21 Apr. 2009, and that can be accessed at https://hal.inria.fr/inria-00377417.

Generally, the shadowgraphy technique comprises producing an oblique illumination of the surface, so as to reveal shadows when the surface has reliefs. The images thus captured can be compared to a reference image without relief, that is to say, here, without bubbles. The reference image is captured beforehand on a portion of the sheet 12 which does not have bubbles. The use of a reference image advantageously makes it possible to avoid lighting defects and undesirable specular reflections. The use of a reference image is optional, because it is possible to mathematically create a reference image from the laws of optics.

For example, a light fuzziness is applied to each captured image, a calculation of the gradient in two directions of the plane is applied to each captured image, and the images are combined into a new grey-scale image and displayed on the display screen 122 and in which the grey level is directly linked to the height of the bubble 50. The resulting image is displayed on the display screen 122 with a grey level scale indicating the possible presence of a defect, and even the dimensions of this defect.

To use the deflectometry technique, the ceiling 106 is transparent and bears, on its bottom face oriented towards the internal volume 108, geometrical patterns 132, here parallel bands, and the display system 100 comprises at least one light source 134, for example a light-emitting diode (LED), arranged on the ceiling 106 and above the geometrical patterns 132, so as to diffuse the light towards the internal volume 108 through the geometrical patterns 132.

The light sources 134 therefore illuminate from behind the geometrical patterns 132, which transmit the light diffusely. A single light source 134 can be sufficient to illuminate all of the geometrical patterns 132, or it may be necessary to have a plurality of light sources 134 positioned so that all the geometrical patterns 132 are illuminated.

In the embodiment of the invention presented in FIG. 1, there is a strip of light sources 134 disposed above the ceiling 106, but it is possible to put in place several of these strips for a better distribution of the light. It is also possible to provide a strip of larger dimensions that makes it possible to cover all of the ceiling 106 by taking a circular or rectangular form.

The geometrical patterns 132 are then projected onto the sheet 12.

Each light source 134 is controlled in terms of switching on and switching off by the processing unit 120.

To avoid a direct illumination of the capture means 118 by the light sources 134, the display system 100 comprises a second opaque cover 136 which comes around the capture means 118 between the light sources 134 and the capture means 118. The second cover 136 here takes the form of a lens hood.

Once the display system 100 is disposed on the sheet 12 and once the pressure inside the bell 102 reaches the desired pressure, the capturing of images by the capture means 118 comprises switching on the light sources 134 and in capturing an image of the sheet 12. The processing unit 120 then comprises means for processing the image thus captured according to the deflectometry technique. One deflectometry technique is notably described in the document "Single-shot deflectometry for dynamic 3D surface profile measurement by modified spatial-carrier frequency phase-shifting method" by Manh The Nguyen, Young-Sik Ghim and Hyug-Gyo Rhee published on 28 Feb. 2019 and that can be accessed at https://www.nature.com/articles/s41598-019-39514-6.

Generally, the deflectometry technique comprises identifying a deformation of the geometrical patterns 132 in the image thus captured.

For example, a filter is applied to the captured image, the projected geometrical patterns are identified on the captured image, and the deformations of the projected geometrical patterns are then identified and allow a three-dimensional reconstruction of the surface of the sheet 12, from which bubbles can be detected.

The internal surface of the lateral wall 104, that is to say, the one oriented towards the internal volume 108, is preferably covered with a mirror surface. This allows the geometrical patterns 132 to be reflected on the lateral wall 104, and thus the ability to use the deflectometry technique over all the surface of the sheet 12 to be inspected.

To limit the impact of the mirror surface, when processing by shadowgraphy, the mirror surface is covered with a liquid crystal screen whose opacity is controlled electronically by the processing unit 120.

The display system according to the invention thus makes it possible to detect bubbles on aircraft panel sheets by using a shadowgraphy technique and/or a deflectometry technique.

Figure 2:
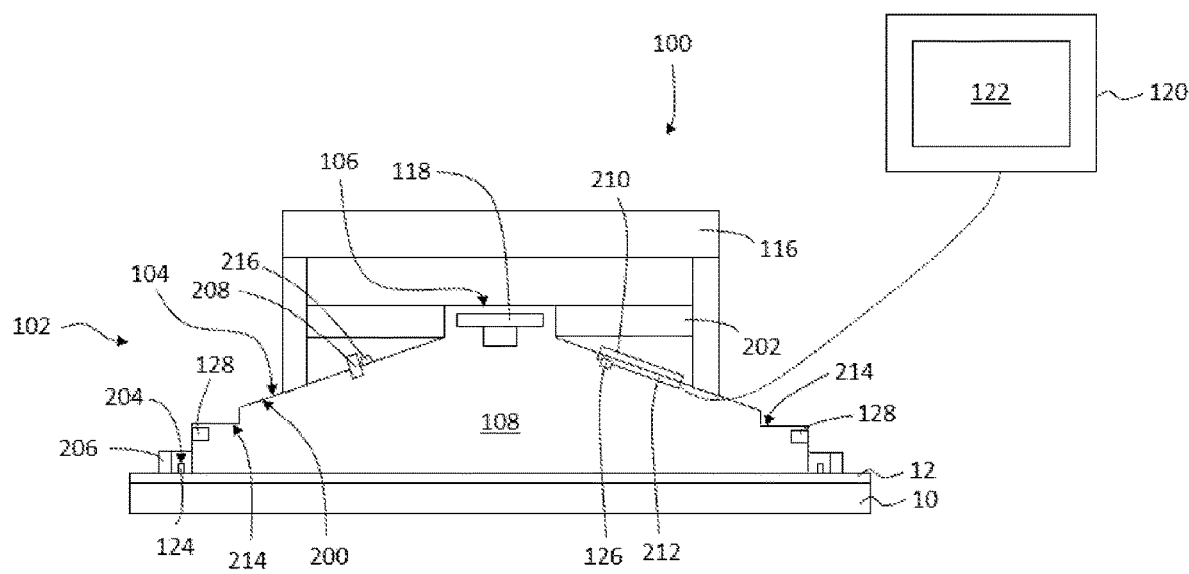
FIG. 2 is a schematic cross-sectional view of a display system according to another embodiment of the invention.

FIG. 2 shows another embodiment of a display system 100 which makes it possible to display a bubble present between a panel 10 and an adhesive sheet 12 glued onto the panel 10.

The display system 100 comprises a bell 102, which, here, is of pyramidal form, and comprises four lateral walls 104, and a ceiling 106 fixed at the top part of each lateral wall 104 to limit between them an internal volume 108 that is open opposite the ceiling 106.

The internal surface of the lateral wall 104 and the ceiling 106 are covered with a lining 200 produced in an anti-reflection material. Thus, the lining 200 makes it possible to avoid the reflection of the light from the light sources 128 in the bell 102.

The display system 100 here comprises four light sources 128 distributed at each corner of the pyramidal form of the bell 102, that is to say, at each joint between two adjacent lateral walls 104, inside each lateral wall 104, around the opening at the foot of each lateral wall 104. Each light source 128 is disposed at approximately 1 cm from the sheet 12 to be displayed.

To avoid a direct illumination of the capture means 118 by the light sources 128, for each light source 128, a portion of each lateral wall 104 forms a cover 214 which comes between the light source 128 and the capture means 118. The pyramidal form of the bell 102 allows the portion of each lateral wall 104 to form the cover 214.

The display system 100 also comprises a handle 116 fixed on top of the ceiling 106. Reinforcements 202, made of a metallic material, are arranged between the handle 116 and the bell 102. The reinforcements 202 allow the handle 116 to withstand the mechanical forces to which it is subjected when the depressurization is performed.

The depressurizing means comprises a protection valve 208 that makes it possible to protect the bell 102 against an underpressure in the internal volume 108.

The display system 100 also comprises an indicator 216 configured to switch from an inactive position to an active position when the protection valve 208 switches from its closed position to its open position. The indicator 216 can be a light source, such as a light-emitting diode, which is off in inactive position, and which comes on in active position. The indicator 216 thus allows the user of the display system 100 to see that the protection valve 208 is open, and therefore that there is an underpressure in the internal volume 108.

To ensure a good seal between the bell 102 and the sheet 12, the lateral wall 104 is equipped with a first seal 124, which extends in a groove 204 formed at the foot of the lateral wall 104.

The display system 100 also comprises a second seal 206, arranged at the foot of the lateral wall 104, outside the bell 102. The second seal 206 makes it possible to prevent the display system 100 from leaving traces on the sheet 12 when performing the depressurization.

The display system 100 also comprises an electronic circuit board 212, disposed inside the bell 102, on a lateral wall 104. The electronic circuit board 212 comprises the pressure sensor 126. The electronic circuit board 212 is connected to the processing unit 120, to the capture means 118 and to the light sources 128. The electronic circuit board 212 is linked to the processing unit 120, preferably by a USB connection. The electronic circuit board 212 is configured to supply power to the light sources 128 and the capture means 118. The electronic circuit board 212 is also configured to control the light sources 128 and the capture means 118, on instructions from the processing unit 120.

The display system 100 comprises a second display screen 210, arranged on the bell 102, and connected to the pressure sensor 126. The measurement of the pressure in the internal volume 108 is performed in real time, and displayed in real time on the second display screen 210.

A display method implementing the display system 100 described above comprises the steps of:
  placing the opening of the bell 102 on the adhesive sheet 12 which is glued onto a panel 10, in particular of an aircraft;
  producing a depressurization in the internal volume 108, by means of the depressurizing means;
  capturing at least one image of the sheet 12 by means of the capture means 118;
  transmitting the at least one captured image to the processing unit 120;
  sending the at least one transmitted image to the display screen 122; and displaying the at least one sent image on the display screen 122.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display system comprising:
a bell shaped housing comprising at least one lateral wall and a ceiling fixed at a top part of the lateral wall to delimit between the at least one lateral wall and the ceiling an internal volume in which the bell shaped housing has an opening opposite the ceiling,
a first seal which extends in a groove formed at a foot of the at least one lateral wall,
a second seal arranged at the foot of the at least one lateral wall and outside the bell shaped housing,
depressurizing means configured to produce a depressurization in the internal volume,
image capture means arranged at the ceiling and whose visual axis is oriented towards the opening,
a display screen, and
a processing unit arranged to receive an image captured by the image capture means, to process the received image according to a shadowgraphy technique or to a deflectometry technique, and to send the processed image to the display screen which displays the sent image.

2. The display system according to claim 1, wherein the depressurizing means comprises a vacuum tank, a suction pipeline fluidically linking the vacuum tank to the internal volume, a vacuum pump fluidically linked to the vacuum tank, and a valve installed on the suction pipeline and movable between an open position in which the vacuum tank and the internal volume are fluidically connected, and a closed position in which the vacuum tank and the internal volume are fluidically isolated from one another, and in which the open and closed position of the valve is electrically controlled by the processing unit.

3. The display system according to claim 1, comprising a plurality of light sources distributed inside the lateral wall around the opening at a foot of the lateral wall and in which each light source is controlled in terms of switching on and switching off by the processing unit.

4. The display system according to claim 3, wherein the plurality of light sources are light-emitting diodes.

5. The display system according to claim 3, wherein, for each one of the plurality of light sources, the display system comprises a first opaque cover arranged between the light source and the image capture means.

6. The display system according to claim 5, wherein the ceiling is transparent and bears, on its face oriented towards the internal volume, geometrical patterns, and wherein the display system comprises at least one light source arranged at the ceiling and above the geometrical patterns so as to diffuse light from the at least one light source towards the internal volume through the geometrical patterns and in which the at least one light source is controlled in terms of switching on and switching off by the processing unit.

7. The display system according to claim 6, comprising a second opaque cover arranged around the image capture means between the light source and the image capture means.

8. The display system according to claim 6, wherein an internal surface of the lateral wall is covered with a mirror surface.

9. The display system according to claim 8, wherein the mirror surface is covered with a liquid crystal screen whose opacity is controlled electronically by the processing unit.

10. The display system according to claim 3, comprising an electronic circuit board, disposed on the lateral wall and connected to the processing unit, to the image capture means and to the plurality of light sources, the electronic circuit board being configured to receive an image captured by the image capture means and send the image to the processing unit, and to control the switching on and switching off of the plurality of light sources, on command from the processing unit.

11. The display system according to claim 3, wherein an internal surface of the lateral wall is covered with a lining produced in an anti-reflection material.

12. The display system according to claim 1, comprising a handle fixed on top of the ceiling and metal reinforcements arranged between the handle and the bell shaped housing.

13. The display system according to claim 1, comprising a protection valve arranged on the bell shaped housing and configured to be in a closed position when a pressure in the internal volume is greater than a predetermined pressure threshold, and to be in an open position when the pressure in the internal volume is less than or equal to the predetermined pressure threshold.

14. A method for displaying, by means of the display system according to claim 1, comprising the steps:
placing the opening of the bell shaped housing over an adhesive sheet which is glued onto a panel;
producing a depressurization in the internal volume, via the depressurizing means;
capturing at least one image of the sheet, via the image capture means;
transmitting the at least one captured image to the processing unit;
processing the transmitted image according to the shadowgraphy technique or to the deflectometry technique;
sending the at least one processed image to the display screen; and
displaying the at least one sent image on the display screen.

* * * * *